US011679819B2

(12) United States Patent
Silva

(10) Patent No.: US 11,679,819 B2
(45) Date of Patent: Jun. 20, 2023

(54) VEHICLE TAILGATE WITH INTEGRATED COLLAPSIBLE DOOR

(71) Applicant: Multimatic Inc., Markham (CA)

(72) Inventor: Matthew Silva, Markham (CA)

(73) Assignee: Multimatic Inc., Markham (CA)

( * ) Notice: Subject to any disclaimer, the term of this patent is extended or adjusted under 35 U.S.C. 154(b) by 0 days.

(21) Appl. No.: 17/795,277

(22) PCT Filed: Feb. 17, 2021

(86) PCT No.: PCT/CA2021/050166
§ 371 (c)(1),
(2) Date: Jul. 26, 2022

(87) PCT Pub. No.: WO2021/163788
PCT Pub. Date: Aug. 26, 2021

(65) Prior Publication Data
US 2023/0061847 A1    Mar. 2, 2023

Related U.S. Application Data

(60) Provisional application No. 62/978,087, filed on Feb. 18, 2020.

(51) Int. Cl.
*B62D 33/03*    (2006.01)
*B62D 33/027*    (2006.01)
(Continued)

(52) U.S. Cl.
CPC ......... *B62D 33/03* (2013.01); *B62D 33/0273* (2013.01); *E05D 15/18* (2013.01);
(Continued)

(58) Field of Classification Search
CPC .. B62D 33/03; B62D 33/0273; B62D 33/037; E05D 15/20; E05D 15/18; E05F 15/00;
(Continued)

(56) References Cited

U.S. PATENT DOCUMENTS 6,886,877 B1 *  5/2005  Plavetich ........... B62D 33/0273
                                                296/57.1
6,991,277 B1 *  1/2006  Esler ........................ B60P 3/14
                                                296/50
(Continued)

OTHER PUBLICATIONS

International Preliminary Report on Patentability for International Application No. PCT/CA2021/050166, dated Aug. 23, 2022.

*Primary Examiner* — Dennis H Pedder
*Assistant Examiner* — Melissa Ann Bonifazi
(74) *Attorney, Agent, or Firm* — Borden Ladner Gervais LLP; Brandon Evenson

(57) ABSTRACT

A vehicle tailgate with an integrated collapsible door comprises a tailgate having an outer wall, an inner wall and a cavity there between, a door section of the tailgate having an inboard wall and an outboard wall and being moveable between a closed position and an open position substantially within the envelope of the tailgate, the inboard wall and the outboard wall being connected by a linkage to permit relative movement there between, a first track to guide the motion of the inboard wall and a second track to guide the motion of the outboard wall, and a power drive unit to power the motion of the door section, such that in the closed position of the door section the inboard wall is flush with the inner wall of the tailgate and the outboard wall is flush with the outer wall of the tailgate, and in the open position of the door section at least a portion of the inboard wall and at least a portion of the outboard wall lie within the cavity between the outer wall and the inner wall of the tailgate.

9 Claims, 11 Drawing Sheets

(51) Int. Cl.
*E05D 15/18* (2006.01)
*E05D 15/20* (2006.01)
*E05F 15/00* (2015.01)

(52) U.S. Cl.
CPC .............. *E05D 15/20* (2013.01); *E05F 15/00* (2013.01); *E05Y 2201/684* (2013.01); *E05Y 2201/686* (2013.01); *E05Y 2800/122* (2013.01); *E05Y 2800/71* (2013.01); *E05Y 2900/544* (2013.01)

(58) Field of Classification Search
CPC ......... E05Y 2201/684; E05Y 2201/686; E05Y 2800/122; E05Y 2800/71; E05Y 2900/544
See application file for complete search history.

(56) References Cited

U.S. PATENT DOCUMENTS

| | | | |
|---|---|---|---|
| 7,658,427 B2 * | 2/2010 | Patton, Jr. .......... | B62D 33/0273 296/57.1 |
| 9,988,103 B1 | 6/2018 | Mouch et al. | |
| 11,208,157 B2 * | 12/2021 | Borkar ................. | B62D 33/037 |
| 2021/0221448 A1 * | 7/2021 | Hung ....................... | B60R 3/02 |
| 2021/0403097 A1 * | 12/2021 | Gase .................... | E05F 15/605 |

* cited by examiner

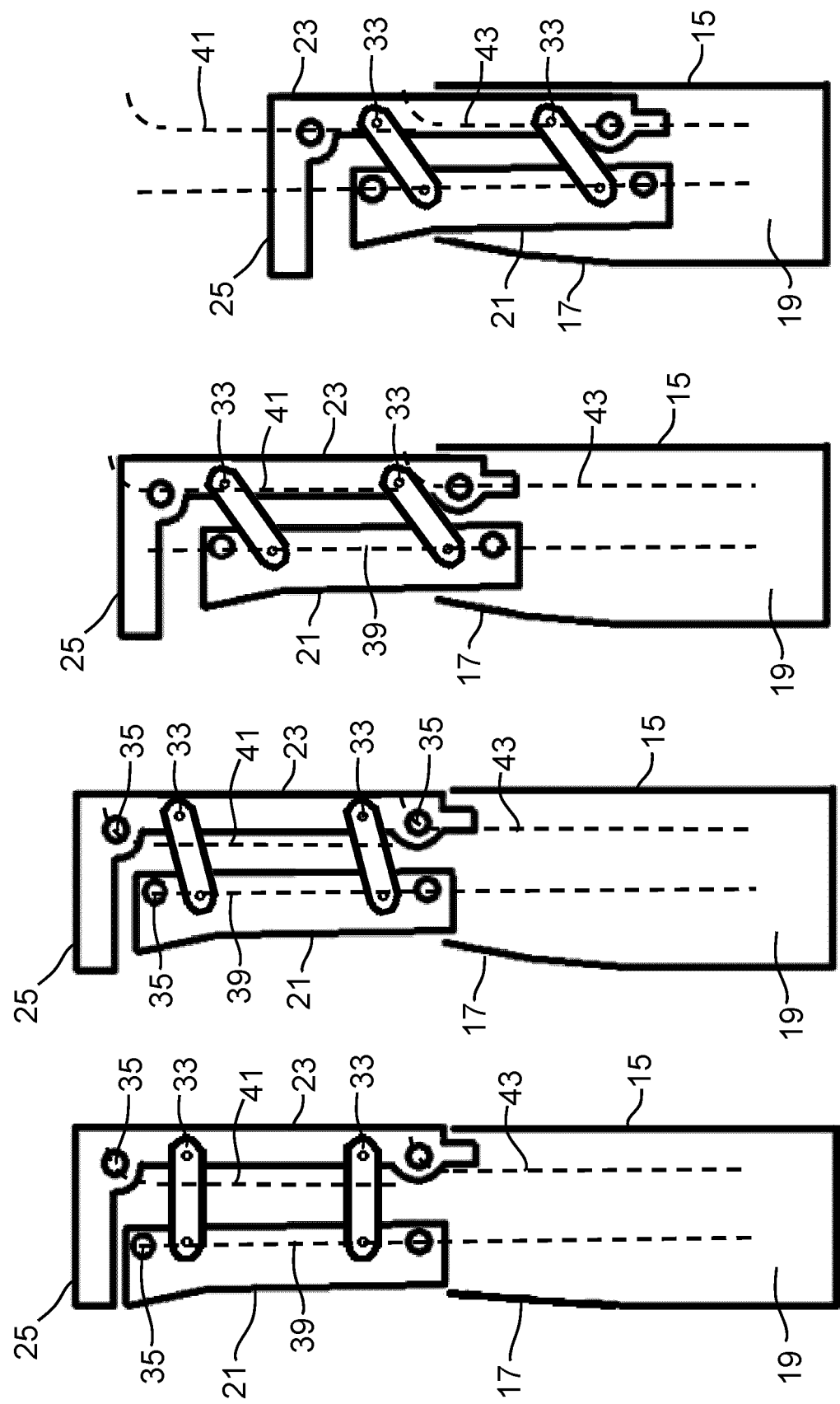

VEHICLE TAILGATE WITH INTEGRATED COLLAPSIBLE DOOR

BACKGROUND

There are various situations in which an opening or door in a pick-up truck tailgate is useful. For example, a tailgate door may provide better access to the cargo area and truck bed or provide a means for enhanced cargo loading, such as flexibility in hauling long loads. In addition, a door within a tailgate may be useful when hooking up and hauling a fifth wheel trailer. An opening, usually in the central, upper portion of the tailgate, permits the boom of a fifth wheel trailer to extend into the area of the truck bed to mate with a hitch mounted to the truck bed. Such a tailgate opening or door may also be useful with the tailgate lowered to horizontal to allow access to a trailer hitch which extends upwards from below the truck bed. Other benefits will be apparent to those who use pick-up trucks.

Various solutions have been proposed to solve this problem. For example, U.S. Pat. No. 9,988,103 discloses a central section of the tailgate which can be removed, hinged horizontally or slid horizontally either to be received into a pocket in the tailgate or to nest over a portion of the tailgate body. Removal is inconvenient and may result in loss of the central section, or damage to it when separated from the tailgate. Hinging is effective, but either reduces the capacity of the truck bed when the hinging is inboard, or limits access to the rear of the truck bed when the hinging is outboard. It is apparent that in the latter sliding embodiments, the external dimensions of the central section must be either less than the dimensions of the tailgate body into which the central section slides, or greater than the dimensions of the tailgate body over which the central section nests or overlies. This necessarily results in discontinuities of the external surface of the tailgate when the central section is in its closed, or home, position. For a variety of reasons, including cleanliness and prevention of snags, this solution presents potential problems.

Accordingly, it would be beneficial to have an integrated tailgate door, preferentially as a central section, which could be received into the body of the tailgate when required, yet would present a smooth, essentially continuous, tailgate contour when in its closed, or home, position.

SUMMARY OF THE INVENTION

A vehicle tailgate with integrated collapsible door which overcomes the problems with various prior art solutions is disclosed in the following description and drawings.

In a principal aspect of the invention, a vehicle tailgate with an integrated collapsible door comprises a tailgate having an outer wall, an inner wall and a cavity there between, a door section of the tailgate having an inboard wall and an outboard wall and being movable between a closed position and an open position substantially within the envelope of the tailgate, the inboard wall and the outboard wall being connected by a linkage to permit relative movement there between, a first track to guide the motion of the inboard wall and a second track to guide the motion of the outboard wall, and a power drive unit to power motion of the door section, such that in the closed position of the door section the inboard wall is flush with the inner wall of the tailgate and the outboard wall is flush with the outer wall of the tailgate, and in the open position of the door section at least a portion of the inboard wall and at least a portion of the outboard wall lie within the cavity between the outer wall and the inner wall of the tailgate.

In a further aspect of the invention, the first track guides the inboard wall vertically and the second track guides the outboard wall vertically into and out of the open position and at least partially laterally into and out of the closed position.

In a further aspect of the invention, rollers guide both the inboard wall in the first track and the outboard wall in the second track.

In a further aspect of the invention, a door cap is connected to the outboard wall and moves with it.

In a further aspect of the invention, the linkage is a four-bar linkage.

In a further aspect of the invention, the first track comprises an upper first track section and a lower first track section and the four-bar linkage comprises an upper four-bar linkage and a lower four-bar linkage.

In a further aspect of the invention, an anti-pinch panel is mounted below the door cap.

BRIEF DESCRIPTION OF THE DRAWINGS

FIG. 22 is a schematic, cut-away, side, elevation view of a door section in the closed position.

FIG. 23 is a schematic, cut-away, side, elevation view of a door section in a first partially open position.

FIG. 24 is a schematic, cut-away, side, elevation view of a door section in a second partially open position.

FIG. 25 is a schematic, cut-away, side, elevation view of a door section in an open position.

DETAILED DESCRIPTION OF THE INVENTION

Figure 1:
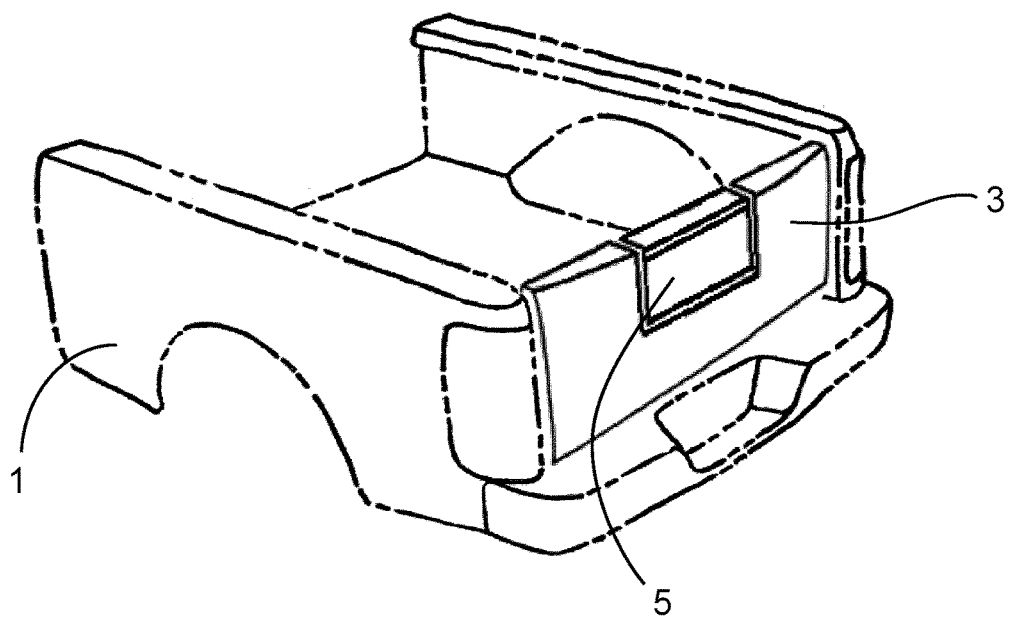
FIG. 1 is a partial perspective view of a vehicle with a tailgate and a tailgate door section.
Figure 2:
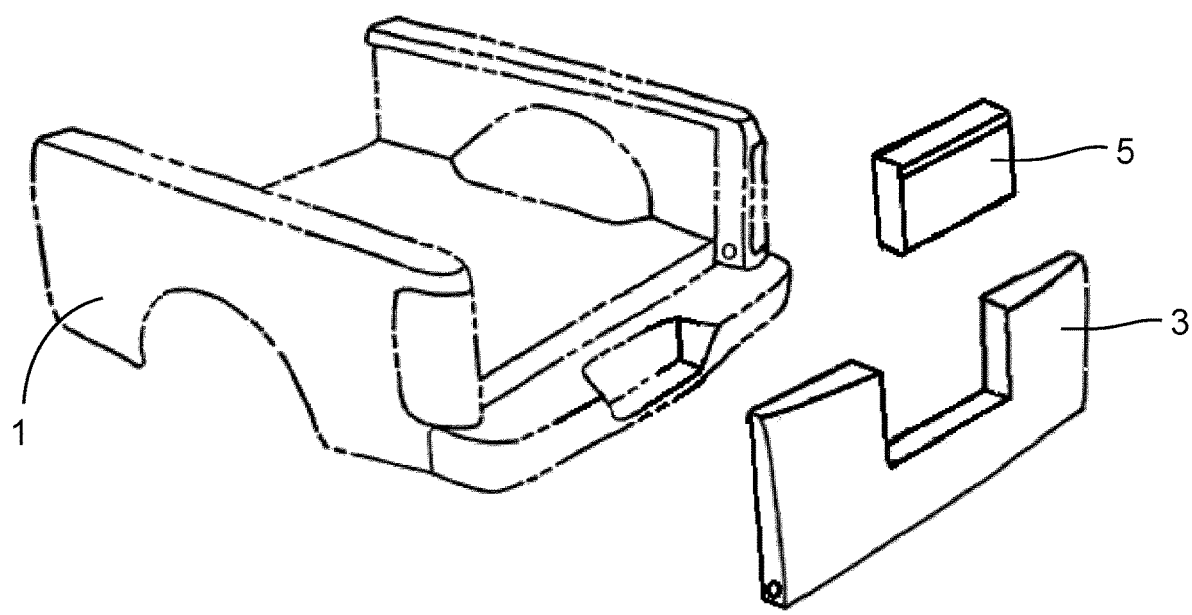
FIG. 2 is a partial exploded perspective view of a vehicle with a tailgate and a tailgate door section.

A vehicle 1, typically a pick-up truck, is fitted with a vehicle tailgate 3. The tailgate 3 also comprises a door section 5. In FIG. 1, the tailgate is illustrated with the door in the normal closed position. An exploded view of these components is illustrated in FIG. 2.

Figure 3:
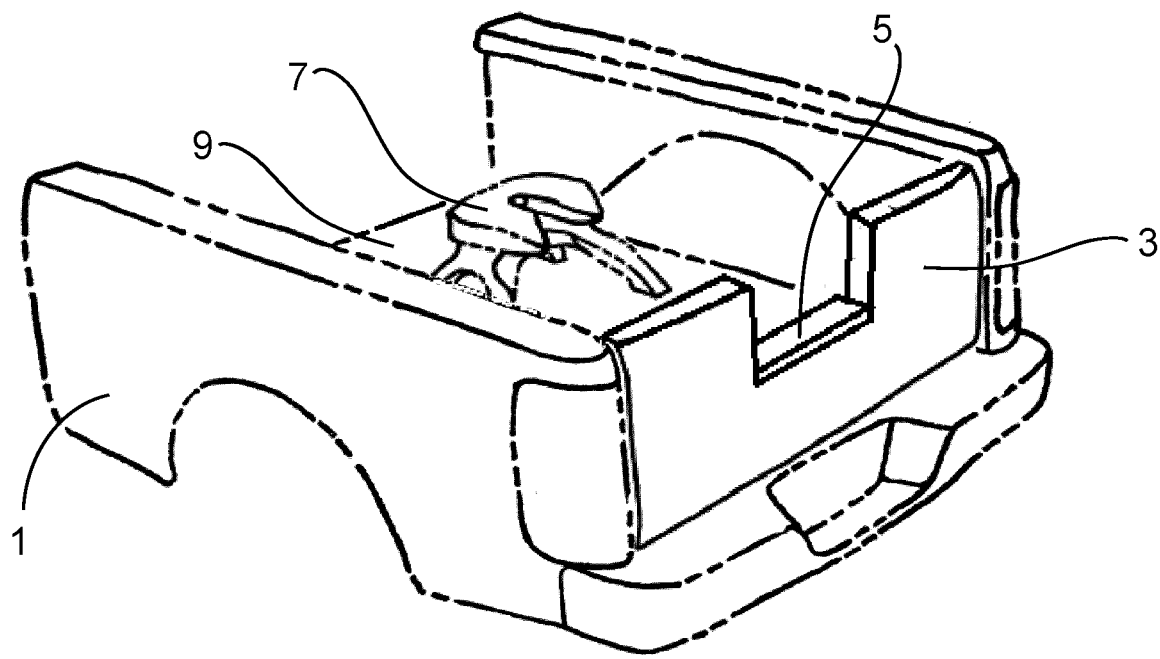
FIG. 3 is a partial perspective view of a vehicle with an open door in a closed tailgate and a fifth wheel trailer hitch.
Figure 4:
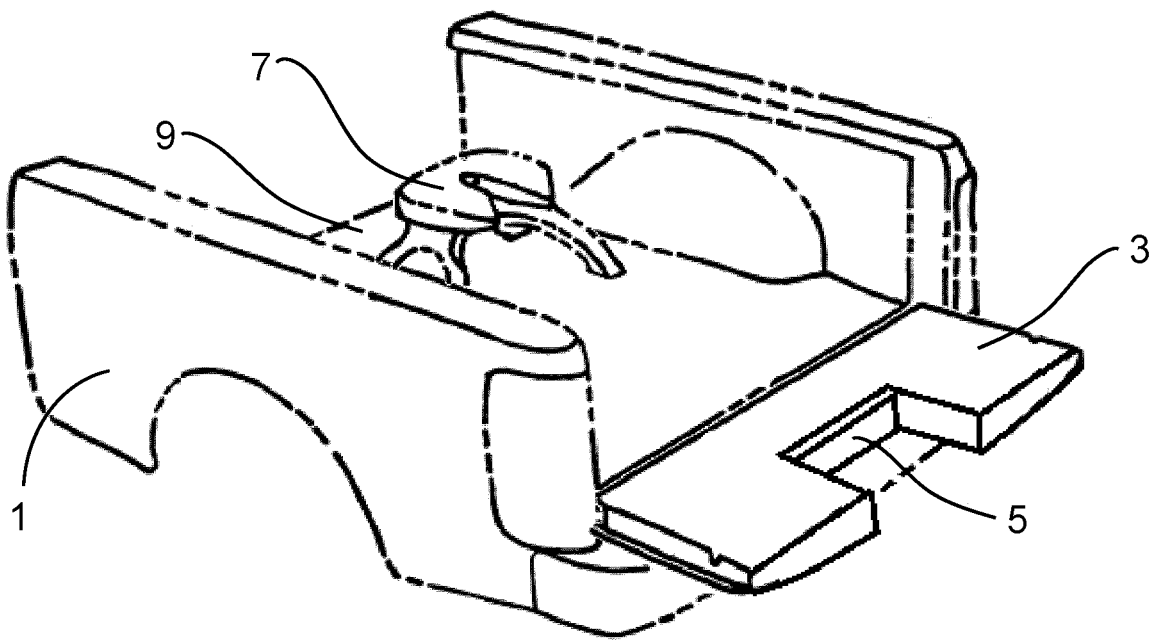
FIG. 4 is a partial perspective view of a vehicle with an open door in an open tailgate and a fifth wheel trailer hitch.
Figure 7:
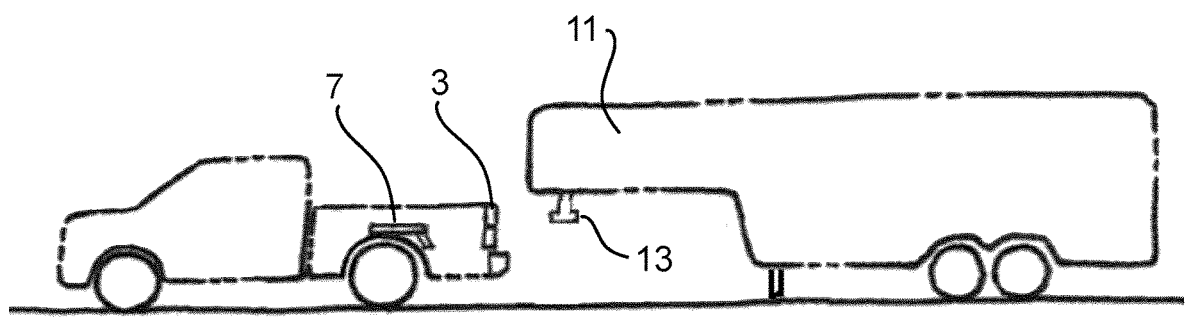
FIG. 7 is an elevation view of a vehicle with a fifth wheel trailer hitch and unattached trailer.
Figure 8:
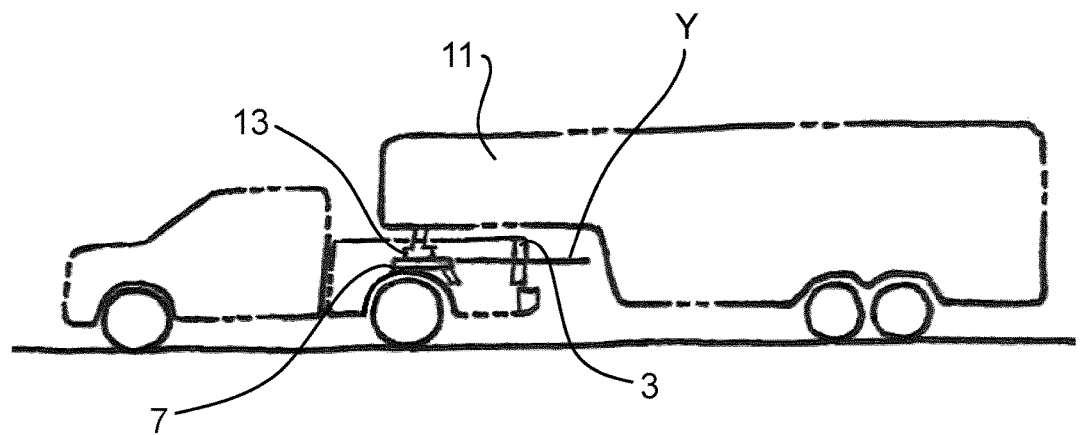
FIG. 8 is an elevation view of a vehicle with a fifth wheel trailer hitch and attached trailer.

FIG. 3 illustrates a fifth wheel trailer hitch 7 mounted to a bed 9 of the cargo area of the vehicle 1. In FIG. 3, the vehicle tailgate 3 is in the normal closed position but with the integral door section 5 retracted within the envelope of the tailgate 3, which may be called an open position of the door section 5. In FIG. 4, the tailgate 3 is open to the horizontal position, still with the door section 5 retracted within the tailgate 3. FIG. 7 and FIG. 8 illustrate a trailer 11 with a gooseneck connector 13 adapted for connection to fifth wheel trailer hitch 7. As illustrated in FIG. 8, with the door section 5 retracted, the gooseneck 13 may move along line Y though the open area in the tailgate 3 created by the retracted door section 5 to engage with fifth wheel trailer hitch 7.

Figure 5:
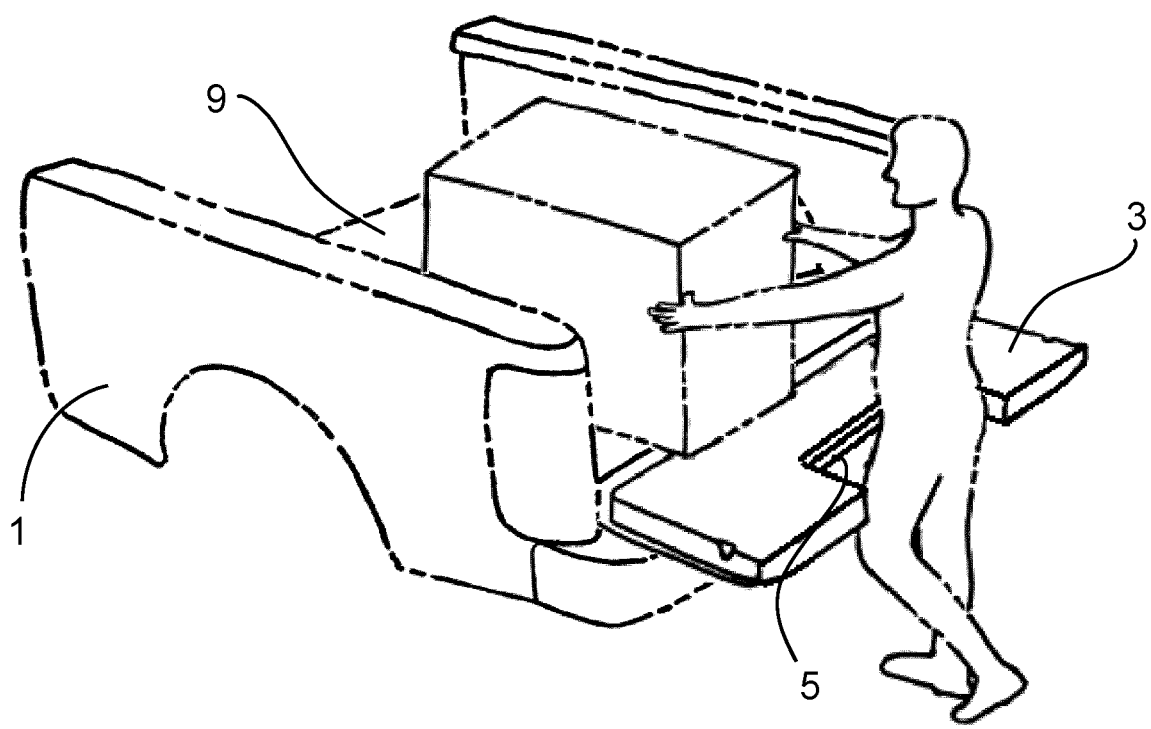
FIG. 5 is a partial perspective view of a vehicle with an open door section in an open tailgate and cargo.
Figure 6:
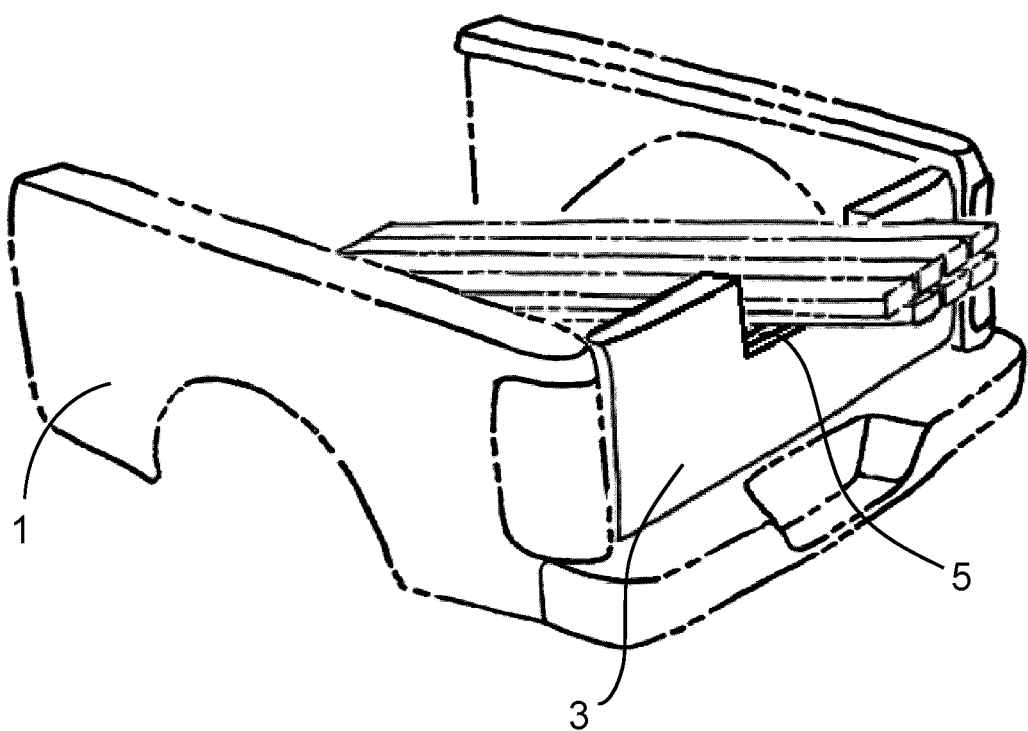
FIG. 6 is a partial perspective view of a vehicle with an open door section in a closed tailgate and cargo.

The integrated retractable door section 5 is useful in a variety of situations apart from those involving a fifth wheel trailer hitch. For example, when the tailgate 3 is in the horizontal open position with the door section 5 retracted, as illustrated in FIG. 5, a user may approach closer to the truck bed to deal with cargo. When the tailgate 3 is in the closed position with the door section 5 retracted, as illustrated in FIG. 6, long cargo carried in the cargo area may extend rearwardly from the vehicle through the open door section, yet be constrained from lateral movement by the tailgate.

Figure 9:
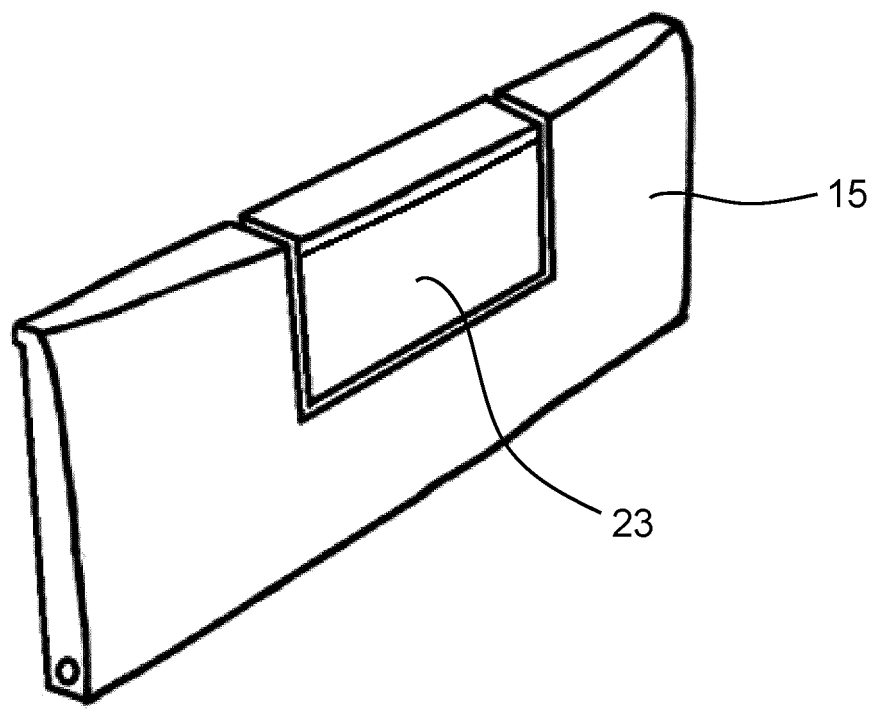
FIG. 9 is a perspective outboard view of a vehicle tailgate with closed door section.
Figure 10:
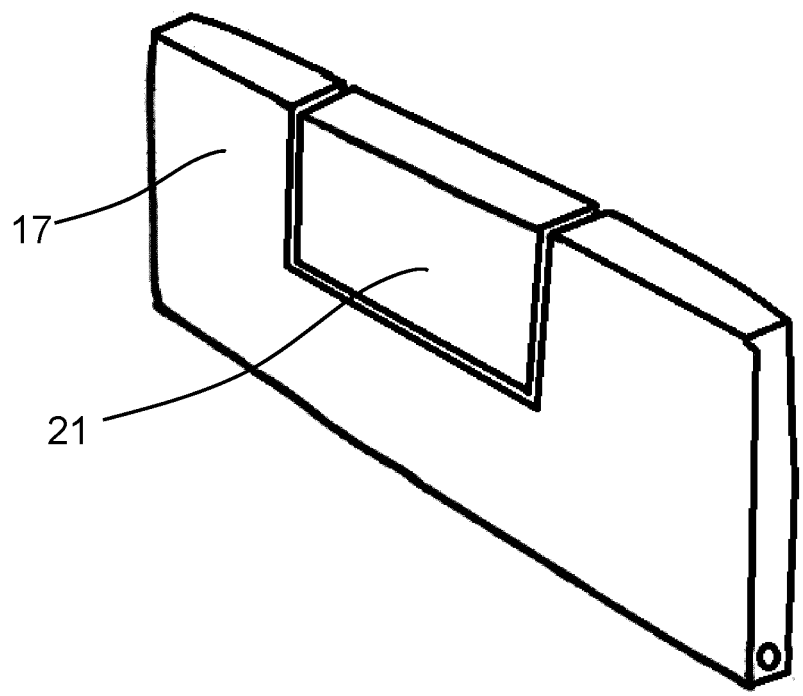
FIG. 10 is a perspective inboard view of a vehicle tailgate with closed door section.

As illustrated in FIGS. 9 and 10, the tailgate 3, typically formed from sheet metal or plastic, or a combination of such materials, comprises an outer wall 15 and an inner wall 17. A fixed spatial relationship is maintained between these outer and inner tailgate walls 15, 17. At least in the area below the door section 5 in the normal door closed position, there is a cavity 19 between the inner wall 17 and the outer wall 15 of the tailgate 3. The cavity 19 is configured to accept the door section 5 when it is opened and retracted into the cavity 19. The door section 5 may be retracted partially or essentially fully into the cavity 19.

The door section 5 comprises an inboard wall 21 and an outboard wall 23. In contrast to the walls of the tailgate 3, the walls of the door section 5 are configured to move in relation to each other. The term wall as used herein in relation to either to tailgate 3 or door section 5 is not intended to indicate a strict two-dimensional or sheet structure. The various walls may have depth and more complex structures as illustrated in the accompanying drawings. When the door section 5 is in the normal closed position, the inboard wall 21 of the door section 5 is essentially flush with the inner wall 17 of the tailgate 3. Similarly, when the door section 5 is in the normal closed position, the outboard wall 23 of the door section 5 is essentially flush with the outer wall 15 of the tailgate 3. This condition mimics a unitary tailgate without a door and is aesthetically pleasing as well as beneficial for maintaining vehicle cleanliness, safety, etc.

Figure 11:
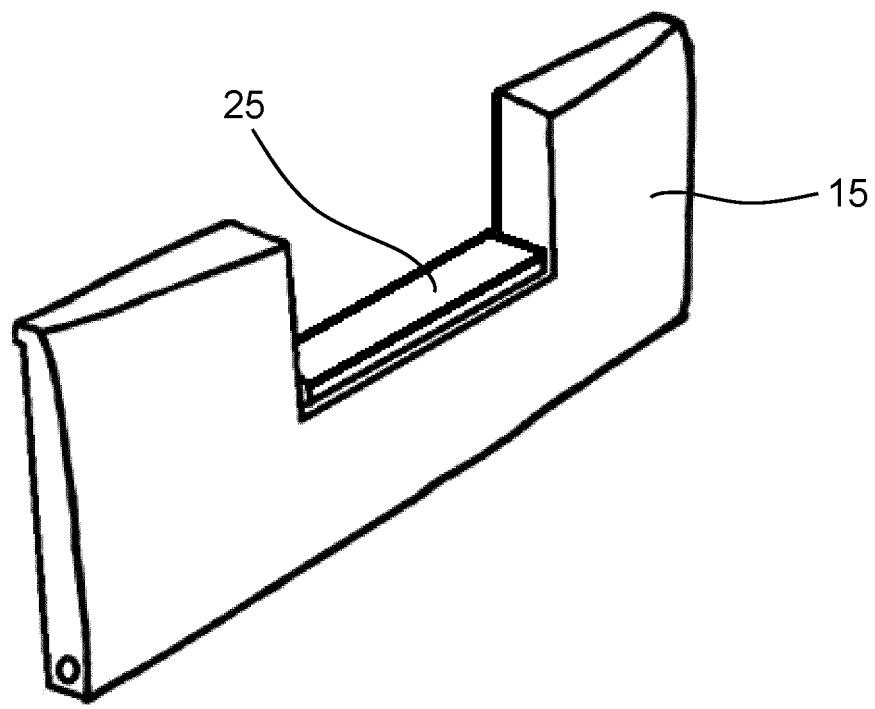
FIG. 11 is a perspective outboard view of a vehicle tailgate with open door section.
Figure 12:
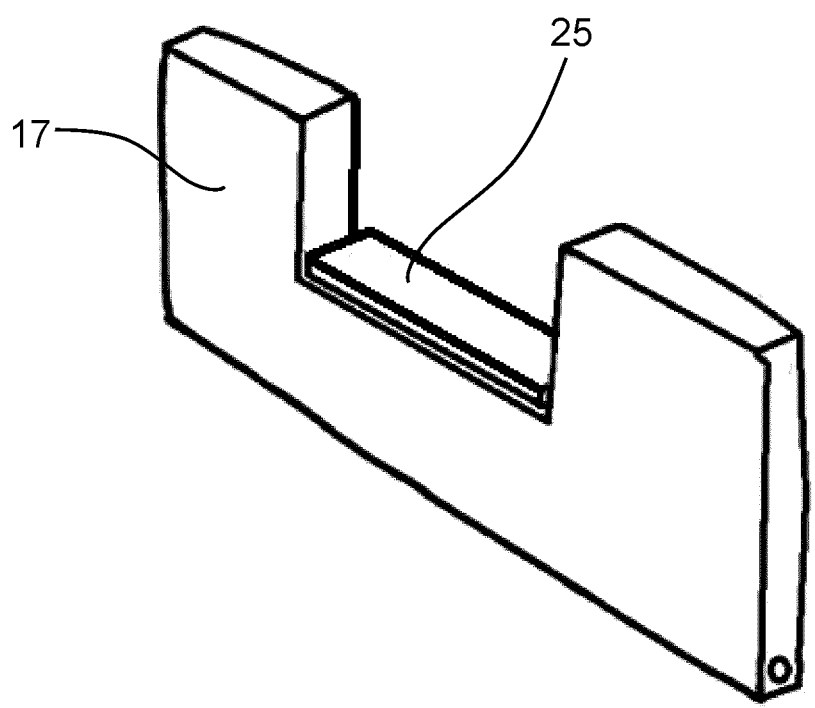
FIG. 12 is a perspective inboard view of a vehicle tailgate with open door section.

FIG. 11 and FIG. 12 illustrate the vehicle tailgate 3 with the door section 5 in the retracted, or open, position. Viewed from outboard the vehicle in FIG. 11 and from inboard the vehicle in FIG. 12, the door section 5 is essentially fully retracted into the cavity 19. The door section 5 is fitted with a cap 25 which provides a suitable upper surface of the door section whether the door section is open or closed. Since the inboard wall 21 and the outboard wall 23 of the door section 5 move in relation to each other when the door section is retracted and extended, the cap 25 is connected to one of the outboard wall 23 and inboard wall 21.

Figure 13:
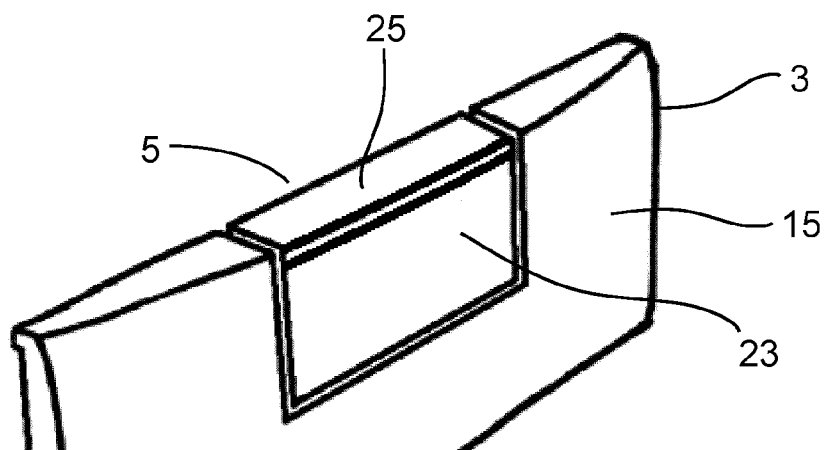
FIG. 13 is a perspective outboard view of a vehicle tailgate with closed door section.
Figure 14:
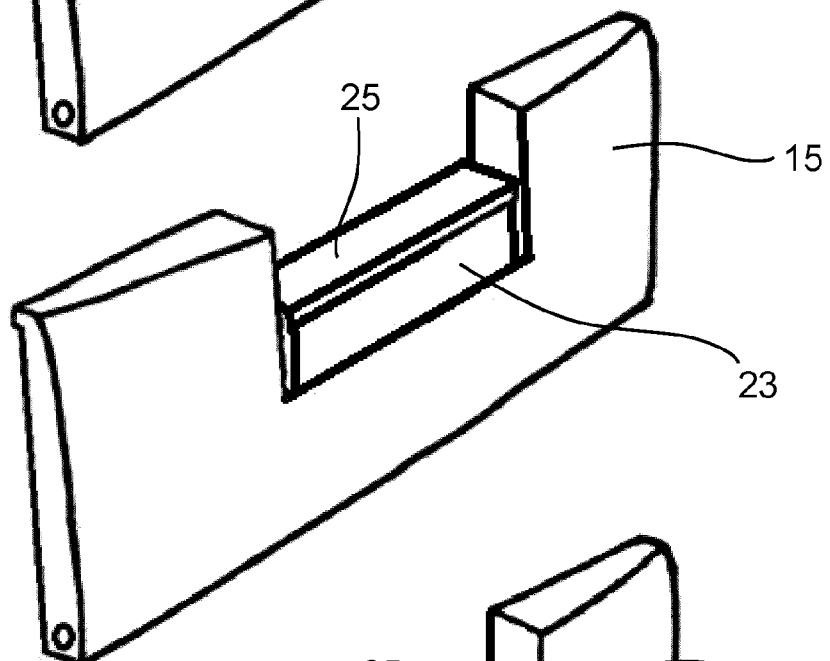
FIG. 14 is a perspective outboard view of a vehicle tailgate with partially open door section.
Figure 15:
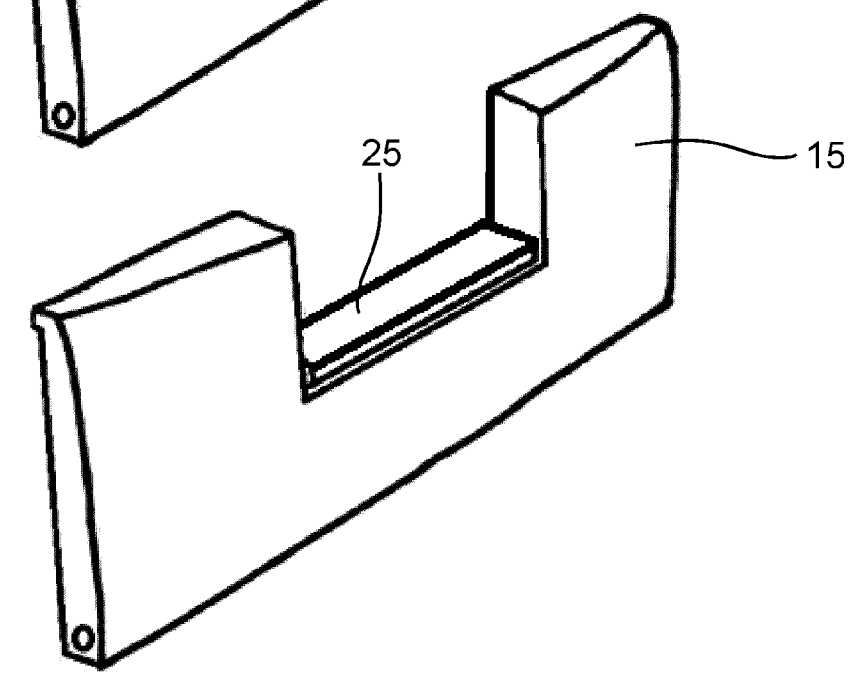
FIG. 15 is a perspective outboard view of a vehicle tailgate with open door section.

FIGS. 13 to 15 illustrate the door section 5, viewed from outboard the vehicle 1, moving from the normal closed position to the fully retracted position. In FIG. 13, with the door section 5 in the normal closed position, outboard wall 23 is exposed and flush with outer wall 15 of tailgate 3. In FIG. 14, door section 5 is partially retracted into cavity 19. Outboard wall 23 now lies within the envelope of the tailgate inner and outer walls 15, 17 to be accommodated within the cavity 19. In FIG. 15, door section 5 is fully retracted into cavity 19. As illustrated in FIGS. 13 to 15, cap 25 is connected to outboard wall 23 of door section 5.

Figure 16:
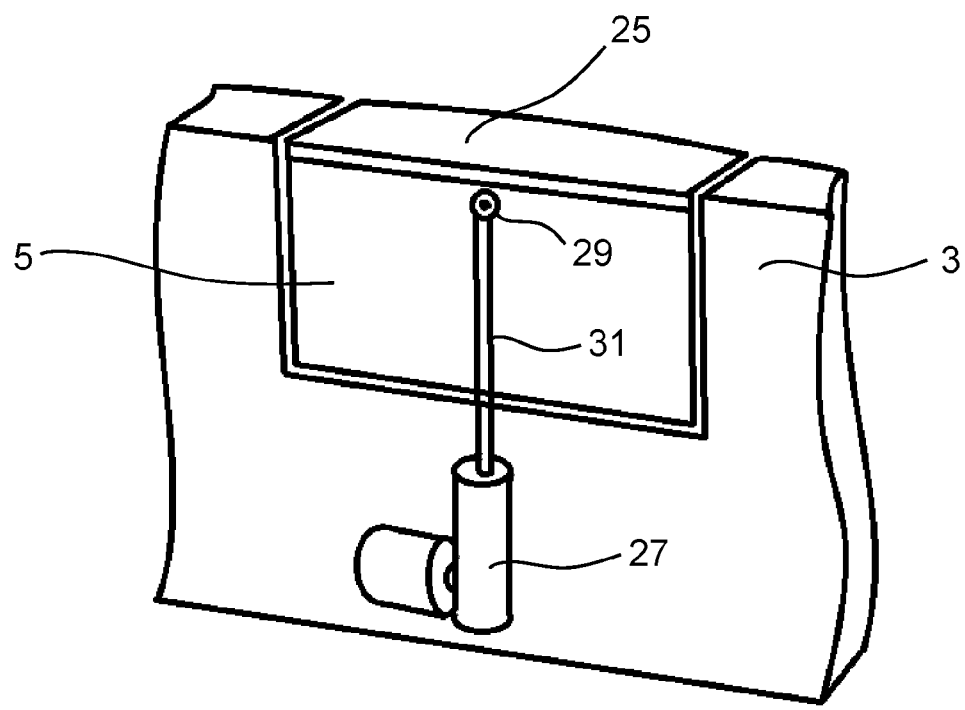
FIG. 16 is a perspective inboard view of a vehicle tailgate with closed door section and power drive unit.
Figure 17:
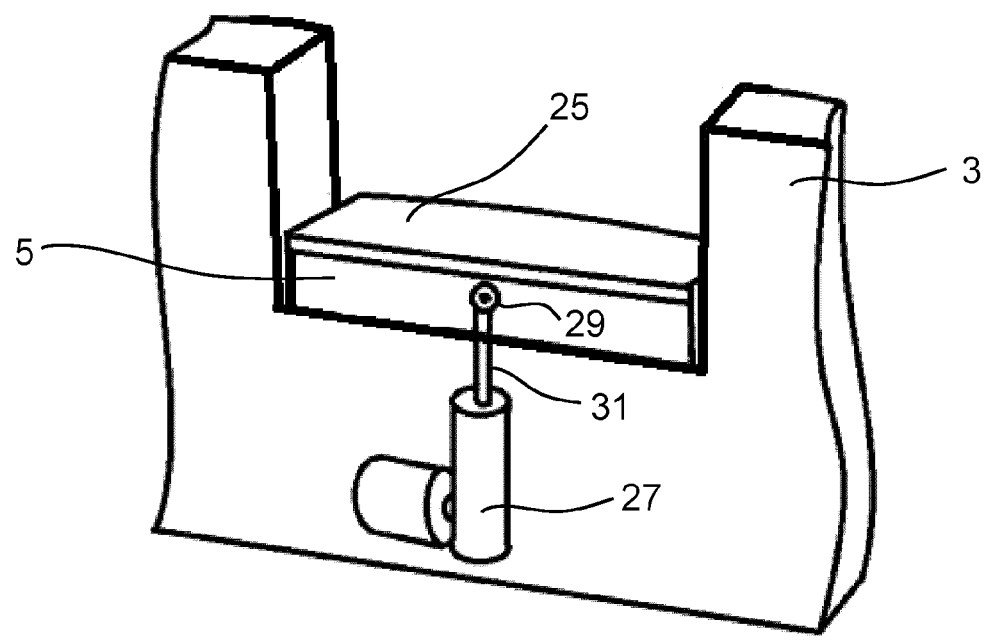
FIG. 17 is a perspective inboard view of a vehicle tailgate with partially open door section and power drive unit.

As illustrated in FIG. 16 and FIG. 17, a power drive unit 27 under the control of a control module (not illustrated) moves the door section 5 between the normal closed and retracted positions. The control module may drive the power drive unit 27 based on limit switches, a stall condition at the power drive unit, or based on other suitable means known in the art. The power drive unit 27 is typically mounted within the cavity 19. In the embodiment illustrated, the power drive unit comprises a rod 31 which translates upwardly and downwardly to extend, or close, and retract, or open, the door section 5. The rod 31 is connected at connector 29 to one of the inboard and outboard walls 21, 23 of the door section 5. In the illustrated embodiment, the power drive unit 27 is connected to the inboard wall 21 which, using a combination of linkages and guides as discussed below, also controls movement of the outboard wall 23.

Figure 18:
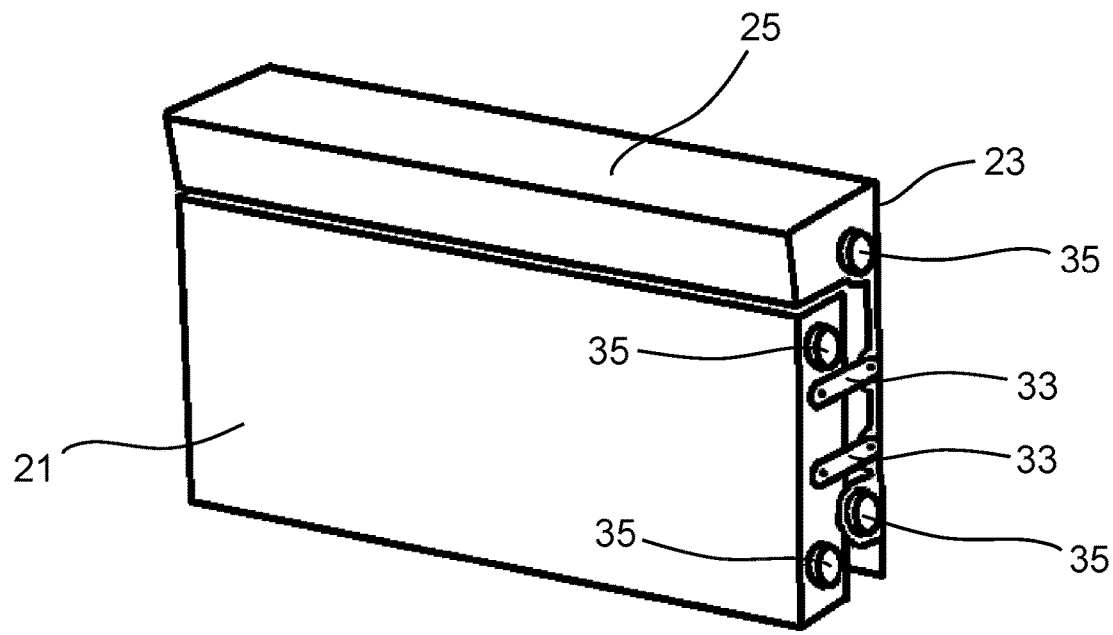
FIG. 18 is a perspective inboard view of a tailgate door section.
Figure 19:
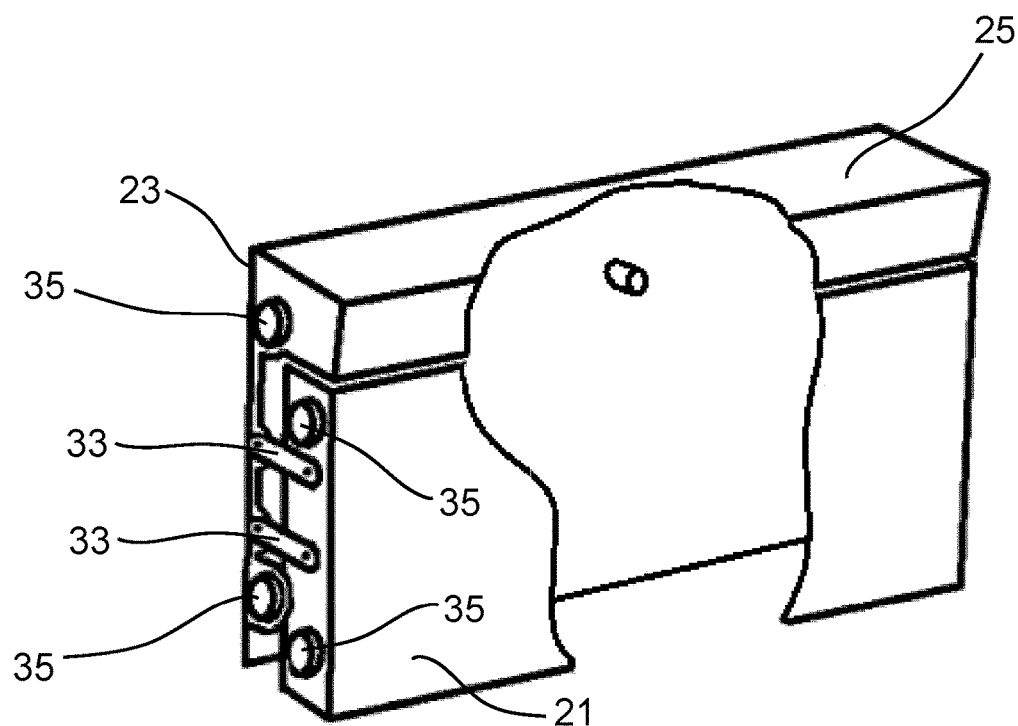
FIG. 19 is a partially cut-away perspective inboard view of a tailgate door section.

As illustrated in FIG. 18 and FIG. 19, each of the inboard wall 21 and the outboard wall 23 is provided with one or more rollers 35. These rollers 35 move along tracks to guide the motion of the door section 5, as further described below. The inboard wall 21 and the outboard wall 23 are connected to each other by linkages 33. The linkages 33 are pivotally mounted at each end to permit the inboard wall 21 and the outboard wall 23 to draw more closely together as the door section 5 is retracted. A four-bar linkage is simple and effective for this purpose. Preferably, there is an upper four-bar linkage and a lower four-bar linkage.

Figure 20:
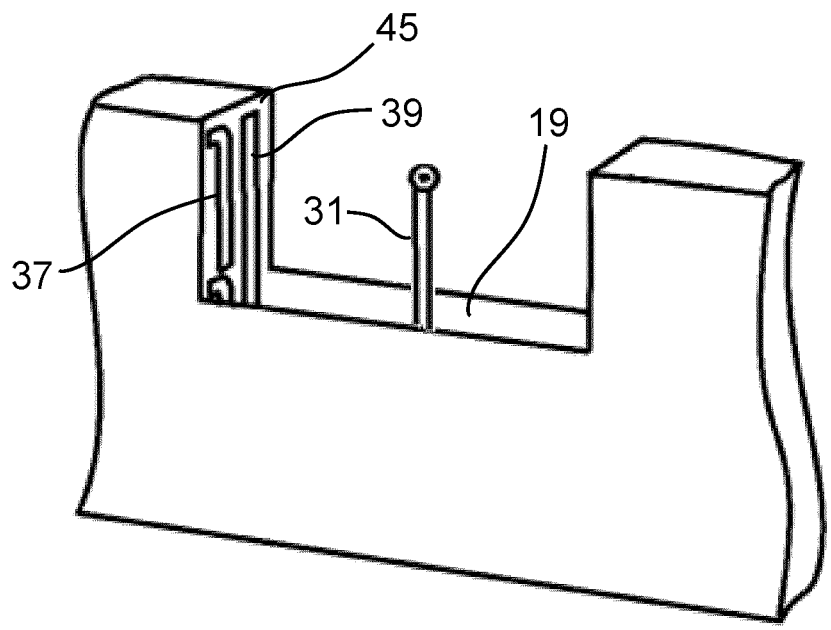
FIG. 20 is a partial perspective vehicle tailgate with the door section removed.
Figure 21:
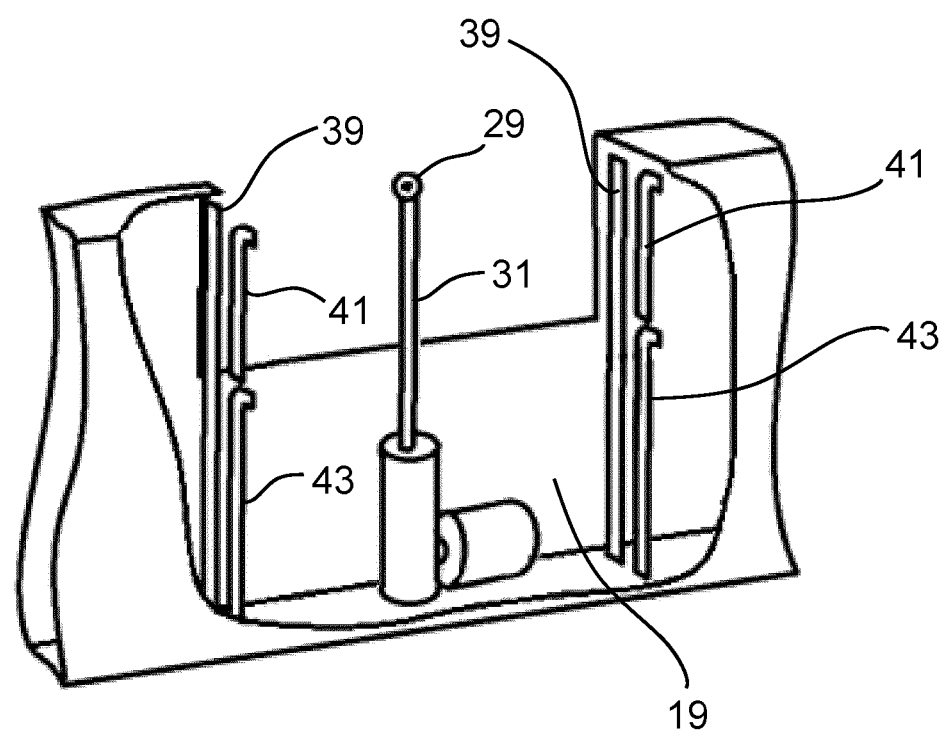
FIG. 21 is a partially cut-away perspective vehicle tailgate with the door section removed.

FIGS. 20 and 21 illustrate the cavity 19 into which the door section 5 may be retracted. The rollers 35 illustrated in FIGS. 18 and 19 run in a first track 39 to guide the motion of the inboard wall 21, and in a second track 37 to guide the motion of the outboard wall 23. The second track 37 may comprise an upper second track section 41 and a lower second track section 43. The second track 37, including upper and lower track sections 41 and 43, and first track 39 are mounted to door facing surfaces 45 of the tailgate 3.

In the illustrated embodiment, the motion of the door section 5 in relation to the tailgate 3 is illustrated in FIGS. 22 to 25. As the rod 31 of power drive unit 27 begins to draw inboard wall 21 downwards, guided by rollers 35 in first track 39, the linkages 33 begin to rotate and inboard wall 21 begins to move downward inside the envelope of inner wall 17. At a point determined by the geometry of these components, drawn by the linkages 33 connecting it to the inboard wall 21, outboard wall 23 also begins to move. Given the curved portions of upper second track section 41 and lower second track section 43, which initially guide the outboard wall 23 horizontally inboard, outboard wall 23 is drawn inside the envelope of outer wall 15 and then is guided downwardly by its connection to inboard wall 21. The motion of both inboard and outboard walls 21, 23 continues until the door section 5 is fully, or sufficiently, retracted within cavity 19. The process is reversed when, following receipt of a signal from the controller to the power drive unit 27, the rod 31 of the power drive unit 27 pushes the inboard wall 21 upwardly. Guided by the rollers 35 in the tracks 37, 39, the inboard and outboard walls 21, 23 extend upwardly and, in the case of outboard wall 23 towards the end of its travel outwardly, until the door section 5 returns to the closed position.

Although the preferred embodiment described above has the inboard wall 21 moving essentially vertically and the outboard wall 23 moving both essentially vertically during most of its range of motion and essentially horizontally to initiate door section 5 opening and to complete door section 5 closing, this configuration may be reversed where appropriate. In the reverse configuration, the inboard wall 21 would move essentially vertically during most of its range of motion and essentially horizontally to initiate door section 5 opening and to complete door section 5 closing, while the outboard wall 23 would move essentially vertically during its range of motion. Although the terms vertically and horizontally have been used in the description, it is understood that motion need not be completely vertical or horizontal to fall within the scope of the invention.

In order to prevent the pinching of fingers or extremities of users or bystanders, a combination of passive and active features may be employed. For example, shingling panels may be used to prevent insertion of fingers or extremities into the mechanism. An anti-pinch panel may be mounted below the door cap. As it is difficult to protect passively against all pinch points, a software based method of pinch detection may also be employed. Upon detection of a pinch event by a suitable sensor, as known in the art, the power drive unit, upon receiving a signal from the control module, will stop driving in the current direction, and will drive in the reverse direction to relieve the pinch condition.

It should be understood that although particular component arrangements are disclosed in the illustrated embodiments, other arrangements will benefit from this invention. Although particular step sequences are shown and described, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although example embodiments have been disclosed, a worker of ordinary skill in this art would recognize that certain modifications would come within the scope of the claims. For that reason, the following claims should be studied to determine their true scope and content.

The invention claimed is:

1. A vehicle tailgate with an integrated collapsible door comprising:
    a tailgate having an outer wall, an inner wall and a cavity there between;
    a door section of the tailgate having an inboard wall and an outboard wall and being moveable between a closed position and an open position substantially within the envelope of the tailgate;
    the inboard wall and the outboard wall being connected by a linkage to permit relative movement there between;
    a first track to guide the motion of the inboard wall and a second track to guide the motion of the outboard wall; and
    a power drive unit to power the motion of the door section;
    such that in the closed position of the door section the inboard wall is flush with the inner wall of the tailgate and the outboard wall is flush with the outer wall of the tailgate, and in the open position of the door section at least a portion of the inboard wall and at least a portion of the outboard wall lie within the cavity between the outer wall and the inner wall of the tailgate.

2. The vehicle tailgate with an integrated collapsible door of claim 1, wherein the first track guides the inboard wall vertically into and out of the open and closed positions and the second track guides the outboard wall vertically into and out of the open position and at least partially laterally into and out of the closed position.

3. The vehicle tailgate with an integrated collapsible door of claim 1, wherein the second track guides the outboard wall vertically into and out of the open and closed positions and the first track guides the outboard wall vertically into and out of the open position and at least partially laterally into and out of the closed position.

4. The vehicle tailgate with an integrated collapsible door of claim 2, wherein the second track comprises an upper second track section and a lower second track section.

5. The vehicle tailgate with an integrated collapsible door of claim 3, wherein the first track comprises an upper first track section and a lower first track section.

6. The vehicle tailgate with an integrated collapsible door of claim 1, wherein rollers guide both the inboard wall in the first track and the outboard wall in the second track.

7. The vehicle tailgate with an integrated collapsible door of claim 1, wherein a door cap is connected to the outboard wall and moves with it.

8. The vehicle tailgate with an integrated collapsible door of claim 1, wherein the linkage is a four-bar linkage.

9. The vehicle tailgate with an integrated collapsible door of claim 8, wherein the second track comprises an upper second track section and a lower second track section and the four bar linkage comprises an upper four bar linkage and a lower four bar linkage.

* * * * *